United States Patent [19]

Spars et al.

[11] 4,337,120
[45] Jun. 29, 1982

[54] BAFFLE SYSTEM FOR STAGED TURBULENT BED

[75] Inventors: Byron G. Spars, Mill Valley; Paul W. Tamm, Oakland; P. Henrik Wallman, Berkeley, all of Calif.

[73] Assignee: Chevron Research Company, San Francisco, Calif.

[21] Appl. No.: 145,290

[22] Filed: Apr. 30, 1980

[51] Int. Cl.$^3$ ............................................. C10B 1/04
[52] U.S. Cl. .................................................. 196/125
[58] Field of Search ............... 202/108, 105, 190, 222, 202/217, 120, 124, 224, 225; 201/40, 31, 32, 34, 14, 12; 261/111, 113; 196/125, 111; 208/11 R; 423/DIG. 16; 422/142, 139

[56] References Cited

U.S. PATENT DOCUMENTS

| | | | |
|---|---|---|---|
| 2,774,726 | 12/1956 | Fichna | 201/14 |
| 2,783,187 | 2/1957 | Odell | 422/139 |
| 2,893,851 | 7/1959 | Georgian | 422/139 |
| 2,944,009 | 7/1960 | Huntley et al. | 422/139 |
| 3,258,409 | 6/1966 | Schenck et al. | 201/40 |
| 3,705,086 | 12/1972 | Schmalfeld | 201/34 |
| 3,982,900 | 9/1976 | Malgarini et al. | 423/DIG. 16 |
| 4,135,885 | 1/1979 | Wormser et al. | 422/142 |
| 4,157,245 | 6/1979 | Mitchell et al. | 208/11 |
| 4,199,432 | 4/1980 | Tamm et al. | 201/31 |

FOREIGN PATENT DOCUMENTS 2910792 10/1979 Fed. Rep. of Germany ........ 201/12

Primary Examiner—Hiram Bernstein
Attorney, Agent, or Firm—D. A. Newell; S. R. LaPaglia; J. W. Ambrosius

[57] ABSTRACT

Disclosed is a preferred baffle system for a staged turbulent bed retort. The system preferably comprises a plurality of at least 4 vertically spaced, horizontally disposed perforated baffles, each of said baffles having an open area in the range of 30–70% of the baffle cross-sectional area.

5 Claims, 3 Drawing Figures

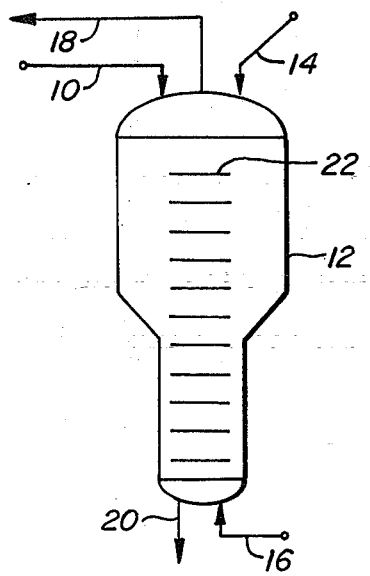
FIG.__1.
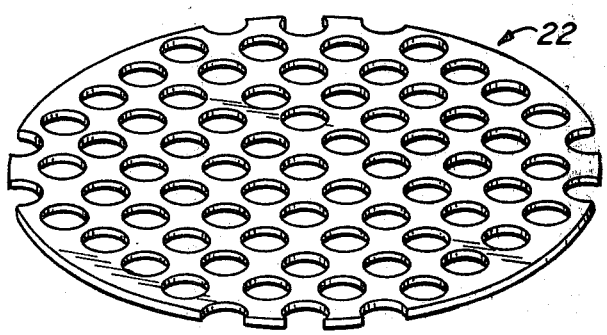
FIG.__2.
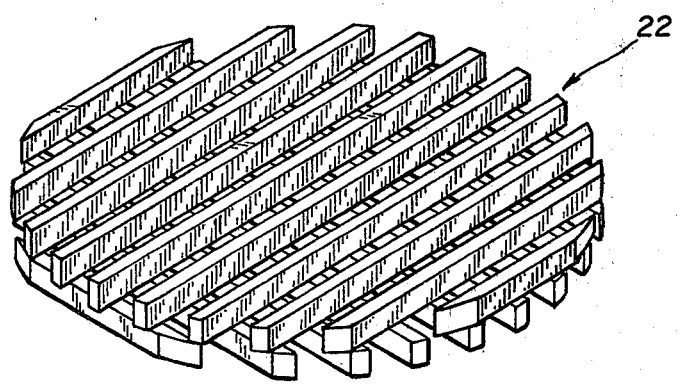
FIG.__3.

BAFFLE SYSTEM FOR STAGED TURBULENT BED

BACKGROUND OF THE INVENTION

1. Field of the Invention

The present invention relates to the retorting of shale in a staged turbulent bed. More specifically, the present invention pertains to a preferred baffle arrangement for such a retort.

2. Description of the Prior Art

A staged turbulent bed retorting process is described in U.S. Pat. No. 4,199,432, incorporated herein, filed Mar. 22, 1978 and issued Apr. 22, 1980, for efficiently and economically retorting shale of a broad particle size distribution. In the process raw shale particles and hot spent shale particles are introduced into an upper portion of a vertically elongated retort vessel and pass downwardly therethrough. Heat transfer from the hot spent shale to the raw shale provides the heat for retorting.

The maximum particle size for the raw shale or previously retorted shale particles in such a process is normally maintained at or below 2½ mesh, Tyler Standard Sieve size. Particle sizes in this range are easily produced by conventional means such as combinations of cage mills, jaw, or gyratory crushers. Raw shale crushing operations may be conducted to meet a maximum particle size specification, but little or no control is effected over the smaller particle sizes.

The temperature of the spent shale introduced to the retort is normally in the range of 1100° F.–1500° F. A correspondingly appropriate operating ratio of heat carrier to shale is then used to achieve the desired temperature in the retort. The raw shale is introduced at ambient temperature or, if desired, preheated to reduce the heat transfer required between the raw shale and the heat carrier. The temperature at the top of the retort is normally maintained within the broad range, 850° F. to 1000° F., and is preferably maintained in the range of 900° F. to 950° F.

The weight ratio of spent shale heat carrier to fresh shale may be varied from approximately 1.5:1 to 8:1 with a preferred weight ratio in the range of 2.0:1 to 3:1. It has been observed that some loss in product yield occurs at the higher weight ratios of spent shale to fresh shale and it is believed that the cause for such loss is due to increased adsorption of the retorted hydrocarbonaceous vapor by the larger quantities of spent shale. Furthermore, attrition of the spent shale, which is a natural consequence of retorting and combustion of the shale, occurs to such an extent that there is a maximum recycle ratio which can be achieved using spent shale alone. The maximum achievable recycle ratio is dependent on the grade of the fresh shale. If it is desired to operate at higher weight ratios of heat carrier to fresh shale, alternative attrition resistant carriers, such as sand, may be substituted as part or all of the heat carrier.

The mass flow rate of fresh shale through the retort is normally maintained between 5,000 kg/hr-m$^2$ and 30,000 kg/hr-m$^2$, and preferably between 10,000 kg/hr-m$^2$ and 20,000 kg/hr-m$^2$. Thus, in accordance with the broader recycle heat carrier weight ratios stated above, the total solids mass rate will range from approximately 12,500 kg/hr-m$^2$ to 270,000 kg/hr-m$^2$, preferably in the range 25,000–176,000 kg/hr-m$^2$, and more preferably 30,000–78,000 kg/hr-m$^2$.

A stripping gas is introduced into a lower portion of the retort and passes upwardly through the vessel in countercurrent flow to the downwardly moving solids. The flow rate of the stripping gas is normally maintained to produce a superficial gas velocity at the bottom of the vessel in the range of approximately 30 cm/second to 150 cm/second, with a preferred superficial velocity in the range of 30 cm/second to 90 cm/second. The stripping gas may be comprised of steam, recycle product gas, hydrogen, an inert gas or any combination thereof. It is particularly important, however, that the stripping gas selected be essentially free of molecular oxygen to prevent product combustion within the retort.

The stripping gas will fluidize those particles of the raw shale and heat carrier having a minimum fluidization velocity less than the velocity of the stripping gas. Those particles having a fluidization velocity greater than the gas velocity will pass downwardly through the retort, generally at a faster rate than the fluidized particles.

An essential feature of the staged turbulent bed retorting system lies in limiting the maximum bubble size and the gross vertical backmixing of the downwardly moving shale and heat carrier to produce stable, substantially plug flow conditions through the retort volume. True plug flow, wherein there is little or no vertical backmixing of solids, allows higher conversion levels of kerogen to vaporized hydrocarbonaceous material than can be obtained, for example, in a fluidized bed retort of equivalent volume where there is gross top to bottom mixing. Maintaining substantially plug flow conditions by limiting top to bottom mixing of solids, allows one to operate the retorting process on a continuous basis with a much greater control of the residence time of individual particles. The use of means for limiting substantial vertical backmixing of solids also permits a substantial reduction in size of the retort zone required for a given mass throughput, since the chances for removing partially retorted solids with the retorted solids are reduced. The means for limiting backmixing and limiting the maximum bubble size are generally described as baffles, barriers, dispersers or flow redistributors, and may, for example, include spaced horizontal perforated plates, bars, screens, packing, or other suitable internals.

Gas bubbles tend to coalesce in the staged fluidized bed to form larger bubbles. Oversized bubbles cause surging or pounding in the bed, leading to a significant loss of efficiency in contacting and an upward spouting of large amounts of material at the top of the bed. The means provided for limiting backmixing also limits the coalescence of large bubbles, thereby allowing the size of the disengaging zone to be somewhat reduced.

Although gross vertical backmixing should be avoided, highly localized mixing is desirable in that it increases the degree of contacting between the solids and the solids and gases. Localized mixing necessarily introduces some vertical mixing and thus deviates from strictly plug-flow behavior. The degree of backmixing is dependent on many factors, but is primarily dependent upon the particular internals or baffles disposed within the retort.

Of great importance in the staged turbulent bed process is the interaction between the fluidized solids, the non-fluidized solids, and the means employed for preventing backmixing. The fluidized solids generally proceed down the retort as a moving fluidized columnar body. Without internals, a stable fluidized moving bed cannot be achieved with a solids mixture having the broad particle distribution of unclassified shale. The means to limit backmixing significantly affects the motion of the non-fluidized particles and thereby substantially increases the residence time of said particles. The average velocity of the falling non-fluidized particles, which determines said particles' residence time, is substantially decreased by momentum transfer to the fluidized solids and the retort vessel internals. This increased residence time thereby permits the larger particles to be retorted in a single pass through the vessel. It has been discovered that with some internals, such as horizontally disposed perforated plates having a 49% free area and spaced throughout the vessel at eight-inch spacings, the residence time of the non-fluidized particles will approach the average particle residence time.

A retort having overall plug flow characteristics, and intense local mixing provides the equivalent of a serial plurality of perfectly mixed stages. The term "perfectly mixed stage" as used herein refers to a vertical section of the retort wherein the degree of solids mixing is equivalent to that attained in a perfectly mixed volume having gross top-to-bottom mixing. The number of equivalent perfectly mixed stages actually attained depends upon many inter-related factors, such as vessel cross-sectional area, gas velocity, particle size distribution and the type of internals selected to limit gross top-to-bottom backmixing. It is preferred that the retort provide the equivalent of at least four perfectly mixed stages.

Excellent stripping of the hydrocarbonaceous vapor from the retorted solids is uniquely achieved with the staged turbulent bed retort. With the staged flow characteristics, the "lean" stripping gas first contacts those particles having the least amount of adsorbed hydrocarbonaceous material, thus maximizing the driving force for mass transfer of the hydrocarbonaceous vapor into the fluidization stream.

Due to the hydrocarbon vapors evolved from the shale which mix with the stripping gas, the gas velocity increases along the length of the column. The actual amount of increase will depend upon the grade of shale processed and the mass rate of fresh shale per unit cross-sectional area, but may be minimized, if necessary, by proper initial design of the retort vessel. In this regard, the vessel may have an inverted frustoconical shape or may be constructed in sections of gradually increasing diameter.

The pressure at the top of the retort is preferably maintained no higher than that which is required to accommodate downstream processing. The pressure in the bottom of the retort will naturally vary with the chosen downstream equipment, but will normally be in the range of 2-4 atmospheres.

A product effluent stream comprised of hydrocarbonaceous material admixed with the stripping gas is removed from the upper portion of the retort by conventional means and passes to a conventional separation zone. Since the product effluent stream will normally contain some entrained fines, it is preferred that said fines be separated from the remainder of the stream prior to further processing. This separation may be effected by any suitable or conventional means, such as cyclones, pebble beds and/or electrostatic precipitators.

The retorted shale along with the spent shale serving as heat carrier is removed from the lower portion of the retort by conventional means at the retort temperature. The retorted shale will normally have a residual carbon content of approximately 2 to 4 weight percent and represents a valuable source of energy which may be used to advantage in the process.

The retorted shale and spent shale are fed to a lower portion of a combustor which may be of any conventional design, but it is preferred to use a dilute phase lift combustor. Air is injected into the lower portion of the combustor and the residual carbon on the shale is partially burned. The carbon combustion heats the retorted shale to a temperature in the range of 1100° F. to 1500° F. and the hot shale and flue gas are removed from the upper portion of the combustor. A portion of said hot shale is recycled to provide heat for the retort. Preferably said recycled shale is classified to remove substantially all of the minus 200 mesh shale prior to introduction to the retort to minimize entrained fines carryover in the effluent product vapor.

SUMMARY OF THE INVENTION

In accordance with the present invention, there is provided an improved baffle system for use with a staged turbulent bed retort having a diameter of at least 1 meter. The baffle system comprises a plurality of at least 4 vertically-spaced, horizontally-disposed perforated plates or grille bars. The bars or plates are constructed of abrasion-resistant materials, such as stainless steel, and have an open area in the range of 30-70% of the plate cross-sectional area. The open areas comprise holes having a diameter in the range of 3.5 to 15 centimeters.

Preferably the open area constitutes approximately 50% of the plate or grille cross-sectional area and the holes have a diameter of approximately 4 centimeters.

The baffles should be serially rotated so that each plate or grille is not in alignment with the preceding or succeeding plate or grille.

DESCRIPTION OF THE DRAWINGS

FIG. 1 is a schematic of a staged turbulent bed retort.

FIG. 2 is a perspective view of a perforated plate baffle suitable for use in the staged turbulent bed retort.

FIG. 3 is a perspective view of a grille plate suitable for use in the staged turbulent bed retort.

DETAILED DESCRIPTION OF THE PREFERRED EMBODIMENTS

Referring to FIG. 1, raw shale particles and hot previously retorted shale particles are introduced through lines 10 and 14, respectively, into an upper portion of a vertically elongated retort 12 and pass downwardly therethrough. A stripping gas, substantially free of molecular oxygen, is introduced, via line 16, to a lower portion of retort 12 and is passed upwardly through the retort, fluidizing a portion of the shale particles. Hydrocarbonaceous materials retorted from the raw shale particles, stripping gas, and entrained fines are withdrawn overhead from an upper portion of retort 12 through line 18. Effluent retorted shale particles are removed from a lower portion of retort 12 through line 20. A plurality of baffles, such as perforated plates or grille structures 22, horizontally disposed within the retort, are vertically spaced throughout substantially all of the retort volume to prevent slugging, limit gross vertical backmixing, and thereby provide stability to the retort bed. Examples of perforated plate baffles and grille structure baffles, suitable for use in the retort are shown in FIGS. 2 and 3 of the drawings.

The maximum particle size for the raw shale and heat carrier (spent shale) is maintained at or below 2½ mesh, and preferably at or below 5 mesh, Tyler Standard Sieve size. A normal distribution of minus 5 mesh crushed shale appears in Table I below.

TABLE 1

| Particle Size, Tyler Standard Sieve | Percent Weight Distribution |
|---|---|
| 5–8 | 25 |
| 8–12 | 13 |
| 12–25 | 25 |
| 25–50 | 14.5 |
| 50–100 | 7.5 |
| 100–200 | 5 |
| 200– | 10 |

With the superficial velocity of the stripping gas at the bottom of the retort vessel in the range of approximately 30–90 centimeters per second, a total mass flow rate in the range of 12,500–270,000 kg/hr-m$^2$ may be achieved. A preferred total mass flow rate is in the range 25,000–176,000 kg/hr-m$^2$ and more preferably 30,000–78,000 kg/hr-m$^2$.

The stripping gas will fluidize those particles of the raw shale and heat carrier having a minimum fluidization velocity less than the velocity of the stripping gas. Those particles having a fluidization velocity greater than the gas velocity will pass downwardly through the retort, generally with a higher velocity than the fluidized particles.

An essential feature of the staged turbulent bed retorting system lies in limiting the maximum bubble size and the gross vertical backmixing of the downwardly moving shale and heat carrier to produce stable, staged flow conditions through the retort volume.

Limiting of the gross vertical backmixing and slugging is attained through the use of suitable internals or baffles. The internals function to break up large gas bubbles, make the bed operation smoother, prevent gas channeling, provide staging for the solids, and insure that the coarse non-fluidizable particles will have a sufficient residence time for retorting.

One measure of the "smoothness" of the bed operation is the fluctuation of the pressure drop across the bed. This fluctuation is caused by gas bubbles erupting at the bed surface and the magnitude of the fluctuation is related to bubble size.

A second measure of bed behavior is the residence time, $\tau$, of the shale particles. Since $\tau$ is a statistical parameter, it is best described in terms of the mean residence time, $\bar{\tau}$, and the standard deviation, $\sigma$. $\bar{\tau}$ is important because of the requirements of the retorting kinetics. The standard deviation is characteristic of the solids flow pattern. If the standard deviation is zero, the bed is operating in plug flow whereas a large value indicates a high degree of vertical backmixing. Considering the bed as a series of N perfectly mixed stages, it can be shown that:

$$N = \bar{\tau}^2/\sigma^2$$

Thus, a simple method of determining the number of stages may be calculated from experimentally determined statistical parameters. It should be noted, however, that N is not necessarily identical for different particle sizes because fine material may experience a somewhat higher degree of backmixing, nor need it be identical to the number of column internals. Since N is proportional to the bed height a more useful quantity is the height equivalent of a mixed stage (HEMS) defined as the bed height divided by the number of stages.

The residence time is generally also a function of the shale particle size. For specified shale particle size ranges it may be determined from the bed holdup of the specified fraction, the feed rate of the fraction, the total feed rate and the total bed holdup. Thus, the means residence time of a particular shale size cut, d, may be calculated as:

$$\frac{\bar{\tau}_d}{\bar{\tau}_{bed}} = \frac{(\text{Bed Holdup of size } d)/(\text{Feed rate of size } d)}{(\text{Total Bed Holdup})/\text{Total Feed Rate}} = \frac{\text{Bed fraction of size } d}{\text{Feed rate fraction of size } d}$$

The residence time may also be experimentally determined by observing the time required for a radioactively tagged particle to pass through the retort. Experiments have shown good correlation between the results of radioactive tracer studies and calculations based on the mean residence times for specified shale fractions and observed bed holdups.

A number of different internals was used in retort vessels having varying diameters in an attempt to select the optimum type and configuration of internals. In selecting the optimum system the following parameters were chosen for guidelines:

(a) limiting slugging;
(b) avoiding gas channeling;
(c) achieving uniform residence time for particles of different size;
(d) providing sufficient staging for the solids;
(e) allowing high mass throughput; and
(f) being of sufficient mechanical strength.

The internals must be effective in limiting the slugging or the formation of large gas bubbles which travel upwardly through the retort vessel. Slugging of the bed is unfavorable from several respects, but the prime disadvantages lie in damaging retort vibrations and disturbances in operation of downstream equipment. Acceptable internals should not permit bed pressure drop fluctuations in excess of 5% of the total mean bed pressure drop and the fluctuations are more preferably maintained in the range of 1 to 3%. The non-slugging condition is obtained by either relatively high open-area baffles with close spacings, such as 80% open area and 2½ centimeter spacings, or lower open-area baffles with broader spacings, such as 50% open area and 30 centimeter spacings.

Gas channeling manifests itself as an abnormally low pressure drop across the bed as compared with the static head of the bed, i.e., the weight of the bed divided by the cross-sectional area of the bed. Gross gas channeling can also be observed visually by a non-uniformity of both gas and solids flow across the cross section. Acceptable internals should produce a bed pressure drop of 80–130% of the bed static head. The lower limit pertains to open baffle structures (70% open area) while the upper limit is associated with low open-area structures (the baffle itself produces some pressure drop).

In general, it has been found that the coarser particles tend to have a shorter residence time in the bed than the mean residence time. This means that the bed tends to equilibrate to a size distribution finer than that of the feed. Low open-area baffle structures have been found to counteract this tendency and produce a bed of similar size distribution to that of the feed. Open baffle structures, on the other hand, produce beds highly enriched in fines.

The staging, expressed for example in terms of the height equivalent of a mixed stage (HEMS), is dependent upon baffle open area, baffle hole size, baffle spacing, gas velocity and, in the cases of open baffle structures particle size. As the baffle open area is decreased the HEMS approaches the baffle spacing that is each baffle produces one perfectly mixed stage. This condition implies that there is no upward backmixing from one stage to the one above, and consequently, the bed has become a series of physically distinct entities. A discrete horizontally positioned gas phase beneath each individual baffle is not necessarily a desirable condition because the gas phase volume serves only to decrease the overall density of the bed, thus requiring a greater reactor volume for a given operation. Increased hole diameter decreases this gas volume but also decreases the staging (increases HEMS). This may be offset by decreasing baffle spacing since HEMS is proportional to the spacing. Another variable which influences the staging is the gas velocity: the HEMS is approximately proportional to the square root of the fluidizing velocity in the range of 30–90 centimeters per second.

The maximum achievable mass throughput is a function of the open area, the hole size and the fluidizing gas velocity. With a 50% open area and a hole size of 1.25 centimeters the maximum throughput was found to be in the range 30,000–60,000 kg/hr-m$^2$ for gas velocities ranging from 30–60 cm/sec. For a hole size of 1.9 centimeters the maximum throughput is in excess of 120,000 kg/hr-m$^2$ indicating that the larger holes essentially remove the constraint on maximum throughput. This is also true for higher open areas.

From a structural point of view, low open-area baffles are preferred to high open-area baffles because of greater inherent mechanical strength for the same hole size. High open-area structures could be built as a special type of packing to provide the needed structural integrity. Standard packing materials such as Pall rings were experimentally found to be inferior to the baffle types of this invention because of gas channeling and stagnant solids regions.

Experiments were conducted to determine the optimum baffle configuration. From these experiments it was determined that the open area should range from approximately 30 to 70% of the total cross-sectional area and that 50% open area provided the best tradeoff between effective staging, minimized gas channeling, high coarse particle residence time, high mass throughput and sufficient structural strength. Such 50% open-area baffles spaced at 30–90 centimeters and having 3.8 to 10 centimeters maximum dimensions were found to produce a stable non-slugging bed, sufficient staging and a coarse particle residence time of 70–80% of the mean residence time for the entire bed. As used herein, the term "maximum dimension" would refer to the diameter of a circular hole or to the diagonal of a rectangular hole.

The baffles, such as vertically-spaced, horizontally-disposed perforated plates having round holes or similarly positioned grille plates comprised of perpendicularly crossing bars, are preferably constructed of stainless steel, or the equivalent thereof to withstand the abrasion of the circulating solids.

What is claimed is:

1. An improved retorting vessel for pyrolyzing a granular oil shale containing a mixture of fluidizable and non-fluidizable particles, said retort characterized as a vertically elongated vessel designed for the downward passage of the granular oil shale in generally counter-current flow to a stripping gas passing upward through the retort, said retort further having a plurality of vertical baffles internally disposed for limiting the gross vertical backmixing of solids and for increasing the residence time of the non-fluidizable particles in the retort, the improvement comprising, said retorting vessel having a diameter of at least one meter and having present in the interior of said retort at least 4 vertically spaced, horizontally disposed, perforated baffles, each of said baffles having an open area in the range of 30–70% of the baffle cross-sectional area, said open area being comprised of holes having a maximum dimension in the range of 3.8 to 10 centimeters.

2. A baffle system as recited in claim 1 wherein said open area is approximately 50% of the baffle cross-sectional area.

3. A baffle system as recited in claim 1 wherein said holes have a maximum dimension of approximately 5 centimeters.

4. A baffle system as recited in claim 1 wherein said holes are not in alignment with the holes of the immediately adjacent baffles.

5. A baffle system as recited in claim 1 wherein said perforated baffles are constructed of stainless steel.

* * * * *